(12) United States Patent
Saxena

(10) Patent No.: US 8,559,310 B2
(45) Date of Patent: Oct. 15, 2013

(54) SYSTEM AND METHOD FOR BANDWIDTH CONTROL

(75) Inventor: Sanjay Saxena, Noida (IN)

(73) Assignee: CA, Inc., Islandia, NY (US)

( * ) Notice: Subject to any disclaimer, the term of this patent is extended or adjusted under 35 U.S.C. 154(b) by 699 days.

(21) Appl. No.: 11/849,709

(22) Filed: Sep. 4, 2007

(65) Prior Publication Data

US 2009/0059791 A1 Mar. 5, 2009

(51) Int. Cl.
*H04J 1/16* (2006.01)

(52) U.S. Cl.
USPC .......................... 370/235; 370/229; 370/468

(58) Field of Classification Search
USPC ....................................................... 370/468
See application file for complete search history.

(56) References Cited

U.S. PATENT DOCUMENTS

| | | | | |
|---|---|---|---|---|
| 5,953,338 A * | 9/1999 | Ma et al. | | 370/395.21 |
| 6,078,953 A * | 6/2000 | Vaid et al. | | 709/223 |
| 6,104,705 A * | 8/2000 | Ismail et al. | | 370/260 |
| 6,502,131 B1 * | 12/2002 | Vaid et al. | | 709/224 |
| 6,636,480 B1 * | 10/2003 | Walia et al. | | 370/229 |
| 6,654,346 B1 * | 11/2003 | Mahalingaiah et al. | | 370/235 |
| 7,433,943 B1 * | 10/2008 | Ford | | 709/223 |
| 7,983,170 B2 * | 7/2011 | Jackowski et al. | | 370/237 |
| 8,176,154 B2 * | 5/2012 | Minhazuddin et al. | | 709/223 |
| 2002/0065599 A1 * | 5/2002 | Hameleers et al. | | 701/117 |
| 2003/0058871 A1 * | 3/2003 | Sastry et al. | | 370/401 |
| 2006/0221824 A1 * | 10/2006 | Anzai | | 370/229 |
| 2007/0047446 A1 * | 3/2007 | Dalal et al. | | 370/237 |
| 2007/0291647 A1 * | 12/2007 | Smith et al. | | 370/237 |
| 2009/0034414 A1 * | 2/2009 | Schuette et al. | | 370/230.1 |

* cited by examiner

*Primary Examiner* — Phuc Tran
(74) *Attorney, Agent, or Firm* — Baker Botts, LLP

(57) ABSTRACT

A method for bandwidth control includes maintaining priority rules for IP traffic. The method further includes determining current traffic characteristics associated with at least a portion of the IP traffic. The method also includes modifying a priority level based in part on the current traffic characteristics. In one embodiment, the method includes modifying a priority level based on a priority level associated with another user, application, protocol type, or interface identifier. In accordance with another embodiment, priority levels are modified in a plurality of networks or network elements.

23 Claims, 2 Drawing Sheets

SYSTEM AND METHOD FOR BANDWIDTH CONTROL

TECHNICAL FIELD

This invention relates in general to network communication, and more particularly to a system and method for analyzing network traffic and allocating bandwidth based on the traffic.

OVERVIEW

Communication systems and architectures have become increasingly important in today's society. One aspect of communications relates to efficient use of bandwidth and control of delays associated with data and information exchanges.

Particularly, business critical applications may suffer in performance because the available bandwidth of a network is being used by other, less critical applications, like e-mail, FTP, or Internet browsing. One possible solution is to restrict the bandwidth allocated for applications perceived as less critical. However, these restrictions could also be in place at times when the perceived critical applications require less bandwidth, and therefore the bandwidth for the less critical applications would be unnecessarily throttled.

SUMMARY OF EXAMPLE EMBODIMENTS

In accordance with the present embodiments, the disadvantages and problems associated with allocating bandwidth on a network have been substantially reduced or eliminated. In particular, bandwidth can be allocated to the various applications on the network based on the current traffic characteristics.

In accordance with one embodiment of this disclosure, a method for managing Internet Protocol ("IP") traffic comprises maintaining priority rules associated with Internet Protocol traffic for a plurality of users, applications, protocol types, or interface identifiers, wherein each priority rule comprises a priority level associated with a user, application, protocol type, or interface identifier related to the Internet Protocol traffic. The method further comprises determining current traffic characteristics associated with at least a portion of the Internet Protocol traffic. The method further comprises automatically modifying a priority level associated with a given user, application, protocol type, or interface identifier based at least in part on an analysis of the current traffic characteristics.

In accordance with another embodiment of this disclosure, the method further comprises automatically modifying a priority level associated with a given user, application, protocol type, or interface identifier based at least in part on a priority level associated with another user, application, protocol type, or interface identifier related to the Internet Protocol traffic.

In accordance with yet another embodiment, the Internet Protocol traffic traverses a plurality of network elements, and automatically modifying a priority level associated with a given user, application, protocol type, or interface identifier based at least in part on an analysis of the current traffic characteristics occurs in at least two of the plurality of network elements.

Technical advantages of certain embodiments include the ability to allocate bandwidth across all or a portion of an entire network or a number of networks using software that alleviates the need to install new hardware at various points on the network. Also, priority levels can be modified in real-time, to adjust to the current traffic characteristics on the network.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
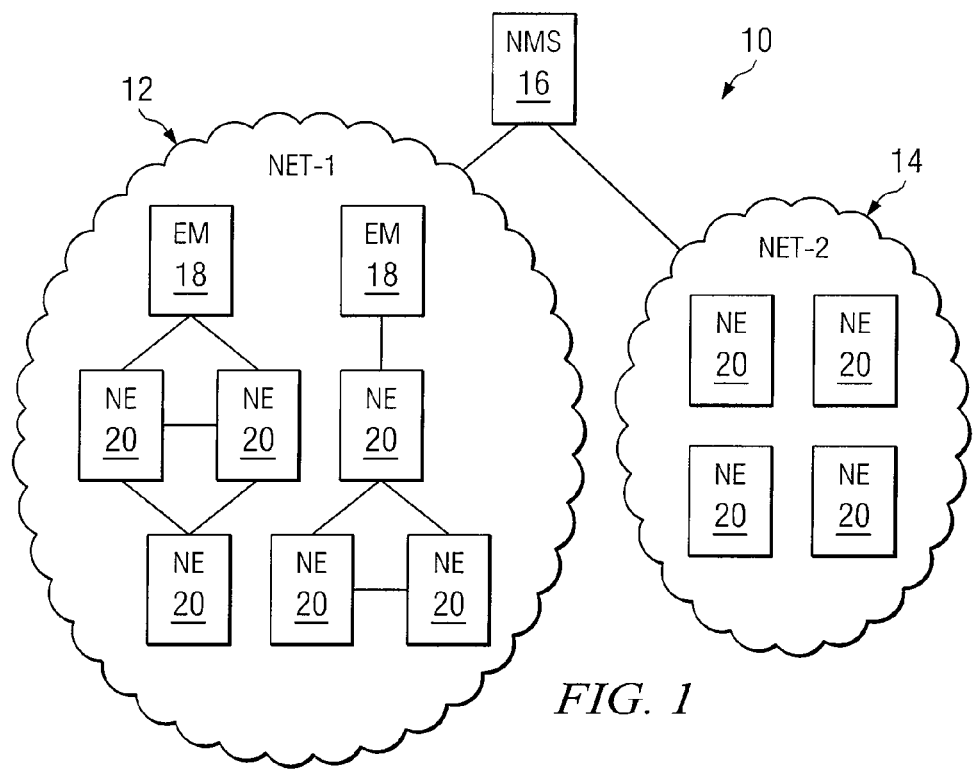
FIG. 1 is a diagram illustrating at least a portion of an example network including a network management system for bandwidth control.

FIG. 1 is a diagram illustrating one embodiment of a computer network 10. Network 10 can comprise one or more sub-networks, such as sub-networks 12 and 14. The network or sub-networks may contain one or more network elements 20. Network elements 20 can include, for example, routers, gateways, switches, computers, or other computing or communication devices. Network 10 may also include one or more element managers 18 which assist in managing network 10, network elements 20, or any sub-networks.

Network 10 may be, for example, wired, wireless, satellite, or any combination of these or other communication media. Network 10 may also include a network management system 16 operably connected to the one or more networks or sub-networks of network 10. Network management system 16 can include components to monitor and/or control the IP traffic on network 10. Network management system 16 and/or element manager 18 can operate to dynamically monitor the IP traffic on the network and apply rules or policies to control the traffic on one or more networks 10 or portions thereof. For example, network management system 16 and/or element manager 18 might determine that Internet browsing traffic is using a large portion of the bandwidth on the network, and that voice traffic needs more bandwidth at this time. Network management system 16 and/or element manager 18 could apply policies, for example in real time, that restrict the bandwidth available for Internet browsing and reserves bandwidth for voice traffic. At a time or date in the future, or when certain conditions are met, or when different traffic conditions are observed, network management system 16 and/or element manager 18 could alter the policies that are applied to, for example, increase or decrease restrictions on various applications or elements, or guarantee bandwidth for certain other applications or elements.

As an example, one embodiment of this disclosure could operate as follows. Network 10 may be a network where video traffic is given highest priority. Network management system 16 and/or element manager 18 could achieve this priority scheme by allocating a certain amount of bandwidth for video traffic, and having other applications use the rest of the bandwidth available on network 10. However, this restricts the bandwidth available to all applications besides video traffic even when video traffic is not using its allocated bandwidth. With real-time monitoring, however, network management system 16 and/or element manager 18 can detect that video traffic is low. Network management system 16 and/or element manager 18 can automatically re-provision the priority rules to make more efficient use of the bandwidth. In this example, the network management system 16 and/or element manager 18 can lower the amount of bandwidth allocated to video traffic, thereby freeing up bandwidth for use by all other applications.

Figure 2:
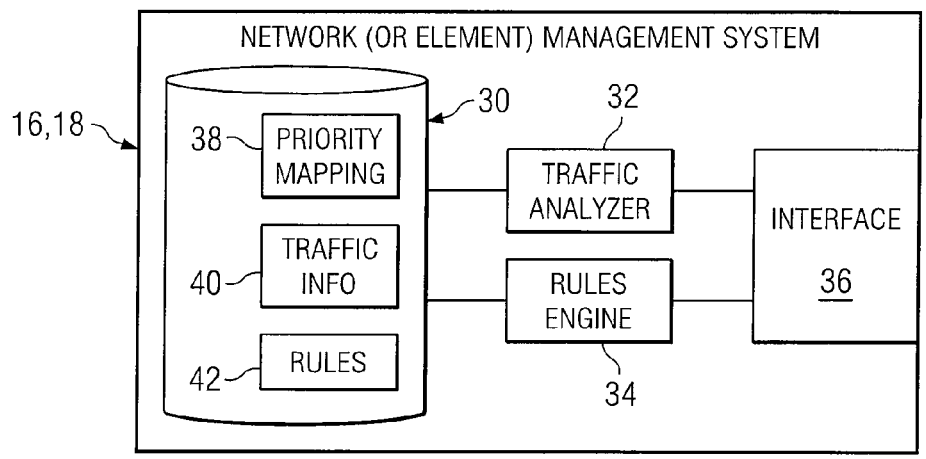
FIG. 2 is a diagram illustrating at least a portion of an example network management system for bandwidth control.

FIG. 2 is a diagram illustrating an example network management system 16 or element manager 18. The management system could be located in various parts of network 10 or outside of network 10. Network management system 16 could also be co-located with an element manager 18 or in a sub-network. This management system includes a memory 30. Memory could be, for example, random access memory (RAM), read-only memory (ROM), or any other type of computer memory. Memory 30 can comprise a single memory device or structure or a collection of memory devices or structures either co-located or geographically or logically dispersed.

Memory 30 stores a priority mapping database 38, traffic information 40, and rules 42. The priority mapping database includes a list of applications, IP addresses, interface identifiers, and/or users on the network and their corresponding priority level. Any one or more of these can be used to determine the appropriate level of service that the network management system 16 or element manager 18 will allow on network 10. Memory 30 also stores traffic information 40 regarding all or a portion of one or more networks 10, which can be generated by the traffic analyzer 32. A number of different software or hardware applications can be used to look at all or a portion of networks 10 and view the current traffic, and store that information in memory 30. Current traffic characteristics can be determined, for example, by using Network Based Application Recognition (NBAR), Simple Network Management Protocol (SNMP), or a variety of other available applications. Memory 30 also stores rules 42, which can be used to determine, possibly in real time, how bandwidth is allocated among the users, applications, IP addresses, interface identifiers, and other traffic identifiers. In this disclosure, the term "real time" is intended to refer to a time at or near the time that the traffic information 40 has been collected.

Management system 16 or 18 also includes a rules engine 34. Rules engine 34 analyzes the traffic on all or a portion of one or more networks 10 and uses the rules 42 to decide how to manage the traffic through the network elements 20. The rules engine 34 may, for example, instruct network elements 20 to allow or slow down certain traffic. The rules engine 34 can also direct traffic to areas of network 10 with available bandwidth, or can choose to not accept low priority applications. Other and additional management functions are contemplated within the scope of this disclosure.

Figures 3, 4, 6:
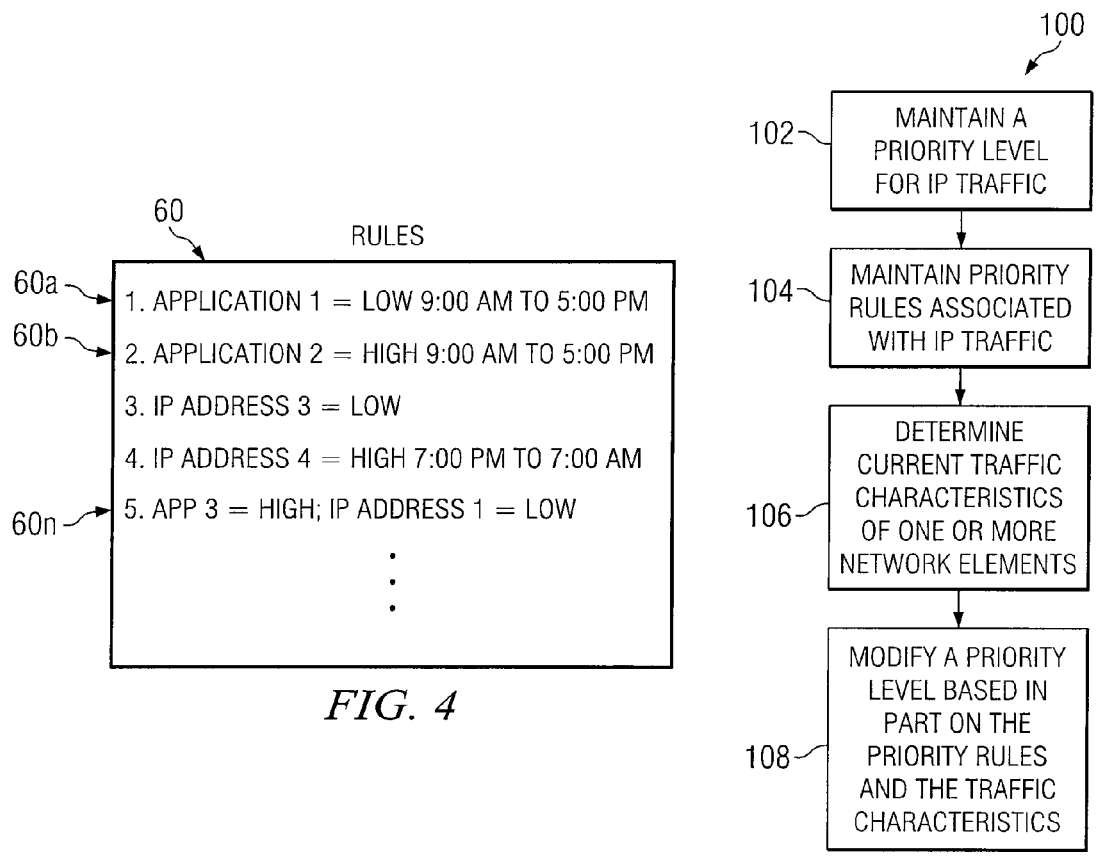
FIG. 3 is a diagram illustrating a priority mapping system.
FIG. 4 is an example set of rules for the network management system.
FIG. 6 is a flowchart illustrating one example of a method for allocating bandwidth on a network.

FIG. 3 shows an example priority mapping file 50 stored in a priority mapping database 38. Here, the various identifiers 52*a*-52*n*, such as IP addresses, protocol IDs, applications, interface identifiers (which are port numbers in this particular example), users, and other traffic identifiers are listed and assigned a priority 54. Any relative priority system can be used, with any number of gradations. For example, in one embodiment the various traffic identifiers can be rated as low, medium, or high priority. Certain applications could be given high priority while others are given low priority. As another example, traffic from specific users could be given high priority, while traffic from other users could be set to low priority. In another embodiment, each traffic identifier could receive a designation, for example a number from 1 to 10, to indicate the level of traffic to allocate to that application, user, IP address, or interface identifier, or other characteristic. In yet another embodiment, certain applications, users, IP addresses, interface identifiers, or other traffic identifiers could be guaranteed a minimum level of bandwidth on network 10. These could be, for example, high priority applications. Other low priority traffic identifiers could be assigned a maximum bandwidth; the total bandwidth allocated to those could be limited so that the rest of the bandwidth could be used for applications deemed more important or otherwise designated.

These types of priority mapping could apply to one or more network elements 20 in network 10 and/or across multiple networks 10. In some embodiments there could also be multiple priority maps, so that different network elements 20 handle traffic based on a different priority map. Alternatively, one priority map could be used that applies to multiple network elements 20 and/or multiple networks 10. Additionally, multiple priority maps could be used so that different priorities are assigned based on factors other than the traffic on the network, such as the time of the day or the day of the week. For example, a business may want to give high priority to voice traffic during the week so that telephone calls are provided with a minimum allocation of bandwidth. During the weekend, the business may want to give voice traffic the same priority as data traffic. This embodiment could use a different priority map for the weekend than for other days of the week. Also, it may be advantageous for a business to give one set of users priority during the daytime hours, and another set of users priority during nighttime hours. A separate priority map for these different hours could be used to accomplish this.

FIG. 4 shows an example of a set of rules 60 for allocating traffic priority. Rules 60*a*-60*n* are used by the rules engine 70 (see FIG. 5) to manage the traffic characteristics on the network 10. Rules 60*a*-60*n* instruct the network elements 20 how to allocate their bandwidth for the various types of IP traffic, based at least in part on the priority mapping shown in FIG. 3. For example, rules 60*a*-60*n* could specify that, for one or more network elements 20, at a certain time of day Applications 1 and 2 are given low priority, and Applications 3 and 4 are given high priority. Rules engine 70 can use one or more of these rules to set the priority for the IP traffic through one or more of the network elements 20. Network element 20 can then act accordingly to direct the traffic through the network element.

Rules 60*a*-60*n* can be written to allocate traffic in a variety of ways, including by application, user, or interface identifier. For example, certain embodiments could allocate traffic by the IP address of the source or the destination. The embodiment may also take into account the application, or it may be designed to focus only on the IP address when allocating traffic. Different users on a network could also have varying priority rules. The priority rules could vary based upon the date or the time of day. The rules could also set priority based upon the current traffic characteristics. For example, the rules could allocate priority based upon one priority map if e-mail traffic is greater than a pre-set threshold, or use a different priority map if e-mail traffic is less than the pre-set threshold.

Figure 5:
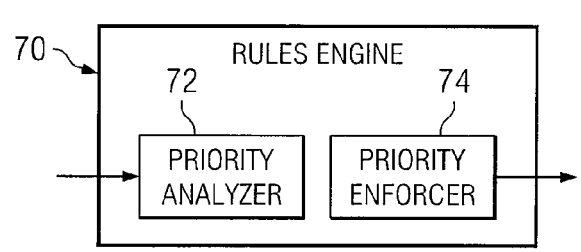
FIG. 5 is an example of a rules engine that maintains priority rules associated with Internet Protocol traffic.

FIG. 5 shows an example of a rules engine 70. In this example, rules engine 70 analyzes rules 42 and traffic information 40, and communicates to the network elements 20 to apply the rules to the traffic on network 10. In some embodiments, rules engine 70 can dynamically adjust which rules to use based on current traffic information. In other embodiments, rules engine 70 could also adjust which rules to use based on other factors, such as the time of day or the day of the week. For example, during business hours voice traffic could be given high priority and Internet browsing could receive low priority. After business hours, these two types of traffic may be handled at the same priority level. In certain embodiments, the rules engine 70 includes a priority analyzer 72 that receives rules 42 and traffic information 40 and performs the analysis. Rules engine 70 also includes a priority enforcer 74 that communicates to the network elements 20 to apply the rules selected by the priority analyzer. Priority enforcer 74 can operate, in some embodiments, to dynamically apply rules to multiple network elements in a communication link, to an entire network, or to multiple networks. Rules engine 70 can also operate to modify rules 42 based, for example, on current traffic conditions observed in traffic information 40, and can apply these modified rules via priority enforcer 74.

FIG. 6 is a flowchart describing a method 100 for allocating bandwidth on a network. The method begins with step 102, where one or more priority levels for IP traffic is maintained. These priority levels can comprise any system that allows for the traffic of various applications, users, or interface identifiers to be ranked relative to one another. At step 104, the method maintains priority rules associated with IP traffic. These rules can be similar to rules 60a-60n described above in regards to FIG. 4. One or more rules are used to allocate traffic priority in the network 10. At step 106, the method determines the current traffic characteristics of one or more network elements 20. Traffic characteristics can be determined by using, for example, NBAR or SNMP. At step 108 the method modifies a priority level, based at least in part on the priority rules and the traffic characteristics. As one option, the priority rules, perhaps modified, can be applied to one or more network elements or networks to respond to current traffic characteristics or anticipated future characteristics.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for managing Internet Protocol traffic, comprising:
   maintaining priority rules corresponding to anticipated Internet Protocol traffic characteristics associated with a plurality of entities during a particular timeframe, each priority rule defining a priority level of access to bandwidth associated with an entity of the plurality of entities during the particular timeframe relative to other entities of the plurality of entities during the particular timeframe;
   determining current Internet Protocol traffic characteristics associated with at least a portion of the plurality of entities during the particular timeframe;
   automatically modifying the priority level of access to bandwidth associated with a given entity of the plurality of entities based at least in part on an analysis of the current Internet Protocol traffic characteristics.

2. The method of claim 1, wherein the priority level of access to bandwidth associated with the given entity is automatically modified based at least in part on a priority level of access to bandwidth associated with another entity related to the Internet Protocol traffic.

3. The method of claim 1, wherein:
   the Internet Protocol traffic traverses a plurality of network elements, and;
   automatically modifying the priority level of access to bandwidth associated with a given entity of the plurality of entities based at least in part on an analysis of the current Internet Protocol traffic characteristics occurs in at least two of the plurality of network elements.

4. The method of claim 3, wherein each network element is governed by a corresponding set of priority rules.

5. The method of claim 1, wherein:
   the Internet Protocol traffic traverses a plurality of networks, and;
   automatically modifying the priority level of access to bandwidth associated with a given entity of the plurality of entities based at least in part on an analysis of the current Internet Protocol traffic characteristics occurs in at least two of the plurality of networks.

6. The method of claim 1, wherein automatically modifying the priority level of access to bandwidth associated with a given-entity of the plurality of entities based at least in part on an analysis of the current Internet Protocol traffic characteristics comprises allocating a minimum amount of bandwidth to the Internet Protocol traffic of the given entity.

7. The method of claim 1, wherein automatically modifying the priority level of access to bandwidth associated with a given entity of the plurality of entities based at least in part on an analysis of the current Internet Protocol traffic characteristics comprises allocating a maximum amount of bandwidth to the Internet Protocol traffic of the given entity.

8. The method of claim 1, wherein the priority level of access to bandwidth for Internet Protocol traffic is based on a source Internet Protocol address.

9. The method of claim 1, wherein the priority level of access to bandwidth for Internet Protocol traffic is based on a destination Internet Protocol address.

10. The method of claim 1, wherein the priority level of access to bandwidth for Internet Protocol traffic is based on a port number.

11. The method of claim 1, wherein the current Internet Protocol traffic characteristics are determined using Network Based Application Recognition.

12. The method of claim 1, wherein the current Internet Protocol traffic characteristics are determined using Simple Network Management Protocol.

13. The method of claim 1, wherein an entity comprises one or more of the following:
   one or more users;
   one or more applications;
   one or more protocol types; and
   one or more interface identifiers.

14. A communication system, comprising:
   a priority mapping database operable to maintain priority rules corresponding to anticipated Internet Protocol traffic characteristics associated with a plurality of entities during a particular timeframe, each priority rule defining a priority level of access to bandwidth associated with an entity of the plurality of entities during the particular timeframe relative to other entities of the plurality of entities during the particular timeframe;
   a traffic analyzer operable to determine current Internet Protocol traffic characteristics associated with at least a portion of the plurality of entities during the particular timeframe;

a priority enforcer operable to modify the priority level of access to bandwidth associated with a given entity of the plurality of entities based at least in part on an analysis of the current Internet Protocol traffic characteristics.

15. The system of claim 14, wherein the priority enforcer is further operable to modify a priority level of access to bandwidth associated with another entity related to the Internet Protocol traffic.

16. The system of claim 14, wherein:
the Internet Protocol traffic traverses a plurality of network elements, and;
the priority enforcer is further operable to modify the priority level of access to bandwidth associated with a given entity of the plurality of entities based at least in part on an analysis of the current Internet Protocol traffic characteristics in at least two of the plurality of network elements.

17. The system of claim 14, wherein:
the Internet Protocol traffic traverses a plurality of networks, and;
the priority enforcer is further operable to modify the priority level of access to bandwidth associated with a given entity of the plurality of entities based at least in part on an analysis of the current Internet Protocol traffic characteristics in at least two of the plurality of networks.

18. The system of claim 14, wherein an entity comprises one or more of the following:
one or more users;
one or more applications;
one or more protocol types; and
one or more interface identifiers.

19. A non-transitory computer readable medium encoded with logic, the logic when executed by a processor operable to:
maintain priority rules corresponding to anticipated Internet Protocol traffic characteristics associated with a plurality of entities during a particular timeframe, each priority rule defining a priority level of access to bandwidth associated with an entity of the plurality of entities during the particular timeframe relative to other entities of the plurality of entities during the particular timeframe;
determine current Internet Protocol traffic characteristics associated with at least a portion of the plurality of entities during the particular timeframe;
automatically modify the priority level of access to bandwidth associated with a given entity of the plurality of entities based at least in part on an analysis of the current Internet Protocol traffic characteristics.

20. The computer readable medium of claim 19, wherein the priority level of access to bandwidth associated with the given entity is automatically modified based at least in part on a priority level of access to bandwidth associated with another entity related to the Internet Protocol traffic.

21. The computer readable medium of claim 19, wherein:
the Internet Protocol traffic traverses a plurality of network elements, and;
the logic is further operable when executed to automatically modify the priority level of access to bandwidth associated with a given entity of the plurality of entities based at least in part on an analysis of the current Internet Protocol traffic characteristics occurring in at least two of the plurality of network elements.

22. The computer readable medium of claim 19, wherein:
the Internet Protocol traffic traverses a plurality of networks, and;
the logic is further operable when executed to automatically modify the priority level of access to bandwidth associated with a given entity of the plurality of entities based at least in part on an analysis of the current Internet Protocol traffic characteristics occurring in at least two of the plurality of networks.

23. The computer readable medium of claim 19, wherein an entity comprises one or more of the following:
one or more users;
one or more applications;
one or more protocol types; and
one or more interface identifiers.

* * * * *